(12) United States Patent
Wobben

(10) Patent No.: US 7,552,614 B2
(45) Date of Patent: Jun. 30, 2009

(54) SYSTEM AND METHOD FOR DETERMINING FUNCTIONALITY OR ACCURACY OF A SENSOR

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 11/786,655

(22) Filed: Apr. 11, 2007

(65) Prior Publication Data

US 2007/0193333 A1    Aug. 23, 2007

Related U.S. Application Data

(63) Continuation of application No. 10/496,335, filed as application No. PCT/EP02/12721 on Nov. 14, 2002, now Pat. No. 7,249,486.

(30) Foreign Application Priority Data

Nov. 27, 2001    (DE)    ................................ 101 57 759

(51) Int. Cl.
*G01F 25/00*    (2006.01)
*G01P 21/00*    (2006.01)
(52) U.S. Cl. ......................... 73/1.29; 73/1.16; 73/1.25; 73/1.26; 73/1.27; 73/1.28; 73/1.34; 73/1.35; 73/196
(58) Field of Classification Search .................. 73/1.16, 73/1.25, 1.26, 1.27, 1.28, 1.29, 1.34, 1.35, 73/196
See application file for complete search history.

(56) References Cited

U.S. PATENT DOCUMENTS

| | | | | |
|---|---|---|---|---|
| 2,265,787 A | * | 12/1941 | White | .......................... 73/112 |
| 2,844,960 A | * | 7/1958 | Staros | .......................... 73/181 |
| 3,357,231 A | | 12/1967 | Till et al. | |
| 4,112,311 A | * | 9/1978 | Theyse | ........................ 290/44 |
| 4,331,881 A | * | 5/1982 | Soderholm et al. | ............ 290/44 |
| 4,829,441 A | * | 5/1989 | Mandle et al. | ................. 702/96 |
| 5,237,975 A | * | 8/1993 | Betki et al. | .................. 123/497 |
| 6,205,376 B1 | * | 3/2001 | Gordon | .......................... 701/4 |

FOREIGN PATENT DOCUMENTS

| | | |
|---|---|---|
| EP | 0 522 832 A1 | 1/1993 |
| EP | 0663520 A1 | 7/1995 |

(Continued)

OTHER PUBLICATIONS

Antoniou, I., et al., "Comparing the power performance results by use of the nacelle or mast anemometer," Nacelle Anemometry on a 1MW Wind Turbine, 941: 1-34, Aug. 1997.

(Continued)

*Primary Examiner*—Hezron Williams
*Assistant Examiner*—Samir M Shah
(74) *Attorney, Agent, or Firm*—Seed IP Law Group PLLC

(57) ABSTRACT

A system and method for determining functionality and accuracy of a sensor such that monitoring of a sensor is possible without the provision of redundant sensors. Briefly described, one embodiment is an anemometer operable to detect wind speed adjacent to the wind power installation, a calculating unit operable to calculate a calculated wind speed using data from an operating parameter of the wind power installation, and a comparison device operable to compare the detected wind speed with the calculated wind speed to determine the functionality of the anemometer.

25 Claims, 4 Drawing Sheets

FOREIGN PATENT DOCUMENTS

| | | |
|---|---|---|
| EP | 1 361 445 A1 | 11/2003 |
| JP | 57198870 (A) | 12/1982 |
| JP | 61-105768 | 7/1986 |
| JP | 62-214275 | 9/1987 |
| JP | 4091373 | 3/1992 |
| JP | 11072502 (A) | 3/1999 |
| WO | WO 01/35109 A1 | 5/2001 |
| WO | WO 02/057800 A1 | 7/2002 |

OTHER PUBLICATIONS

ENERCON GmbH, The Benchmark in Windenergy-Technology, 1-25.

Hunter, R., et al., "Measurement Method to Verify Wind Turbine Performance Characteristics," European Wind Turbine Testing Procedure Developments, 1209: 1-119, Jan. 2001.

Leaney, V. C., et al., "Condition monitoring of wind farms using 10 minute average scada data," European Wind Energy Conference, 234-237, Oct. 1997, Dublin Castle, Ireland.

Stiesdal, H., et al., "The Wind Turbine: Components and Operation," Bonus-Info Special Issue,1999.

Enercon E40 Brochure, "The Benchmark in Windenergy-Technology", 14 pages.

Wind Power, 'Haunui' Wind Farm Project Description, 4 pages.

Electrical Operation and Maintenance Manual for the Vestas V27/V29-225kW Wind Turbine For: 400V and 690V, Version 2.3.0, Sep. 16, 1994, 14 pages.

Patrick March et al., "Your Best Solution for Balancing Optimized Performance with Environmental Responsibility", Hydro Resource Solutions LLC, 5 pages.

McLachlan et al., "ECNZ Central Generation, Technical Paper, Current Practice & Developments in Field Efficiency Testing", Oct. 11, 1997, 26 pages.

Patrick A. March et al., "Your Best Solution for Hydro Plant Condition Monitoring", Jul. 1998, 28 pages.

Genesis Nau Nui Wind Farm Brochure, 2 pages.

* cited by examiner

SYSTEM AND METHOD FOR DETERMINING FUNCTIONALITY OR ACCURACY OF A SENSOR

CROSS REFERENCE TO RELATED APPLICATIONS

This application is a continuation of Ser. No. 10/496,335, filed Nov. 1, 2004, now U.S. Pat. No. 7,249,486 B2 entitled, "METHOD FOR MONITORING A SENSOR," issued on Jul. 31, 2007, which is the U.S. National Phase of PCT/EP02/12721 filed Nov. 14, 2002, which claims priority to German Application No. DE 101 57 759.1 filed Nov. 27, 2001.

BACKGROUND OF THE INVENTION

1. Field of the Invention

The present invention concerns a method of monitoring a sensor for sensing the flow speed of a medium. The invention further concerns an apparatus for carrying out that method.

2. Description of the Related Art

It is already known from JP 11072502 to test the anemometer which is operating defectively in a process or to establish defective operation thereof. In that situation, the signal of the anemometer is evaluated by means of a computer and, with varying wind conditions, the evaluated data are compared and an error signal can be deduced therefrom.

JP 57-198870 discloses a test device for anemometers, in which anemometers are tested under working conditions. U.S. Pat. No. 4,331,881 discloses how an anemometer can be used in a wind power installation, the signal from the anemometer being used to control the wind power installation.

Sensors for monitoring flow speeds of media which are capable of flow have long been known. Quantitative flow speed meters are used in many variations, in dealing with liquids. Anemometers for example are used in the most widely varying structural configurations in relation to gaseous media which also include air.

Those sensors are frequently exposed in situ to environmental conditions which can adversely effect reliable operability thereof. For example, anemometers arranged on wind power installations, depending on the weather, can certainly be subjected to icing. It will be easily appreciated that such an iced-up anemometer can scarcely still ascertain and deliver a correct value for the flow speed of the air. Redundancy does not afford a satisfactory solution here, as the redundantly provided anemometer is naturally also subjected to the icing effect.

BRIEF SUMMARY OF THE INVENTION

Therefore the object of the present invention is to monitor a sensor such that monitoring of a sensor is possible without the provision of redundant sensors.

An exemplary embodiment is method by correlating or comparing of the flow speed of the medium, which is given by the sensor, with at least one operating parameter of an installation operated with the medium. In that respect the invention is based on the realization that such an installation is operated not only on the basis of the data from that one sensor, but frequently operation is dependent on a plurality of parameters. In that manner, a given operating state occurs, independently of the sensor to be monitored but in dependence on the respective flow conditions. If now a characteristic operating parameter is correlated or compared with the flow speed specified by the sensor, it is possible to deduce from that correlation an indication as to whether those values are in a plausible relationship with each other, that is to say whether the sensor is operating faultlessly.

Another exemplary embodiment is further attained by an apparatus having a sensor for detecting the flow speed of a medium, an installation operated with the medium and a correlation device for correlating the flow speed of the medium, which is specified by the sensor, with at least one operating parameter of the installation.

In a preferred development of the method the data from the sensor are correlated or compared with a plurality of operating parameters in parallel or successive relationship. Parallel correlation of the data increases the reliability of the information provided about the sensor function. On the other hand however, depending on the operating state of the installation, it may be appropriate, according to the respective operating conditions involved, firstly to use a first operating parameter for the correlation procedure, but, with changing operating conditions, to make use of a second or further operating parameters for the correlation procedure in order to arrive at an assessment which is as reliable as possible.

In a particularly preferred embodiment of the invention the correlation or comparison device is already integrated into the installation and thus can easily detect the operating parameters required for the correlation or comparison procedure and implement a suitable comparison.

BRIEF DESCRIPTION OF THE SEVERAL VIEWS OF THE DRAWINGS

An embodiment of the invention is described in greater detail hereinafter with reference to the drawings in which.

DETAILED DESCRIPTION OF THE INVENTION

Figure 1:
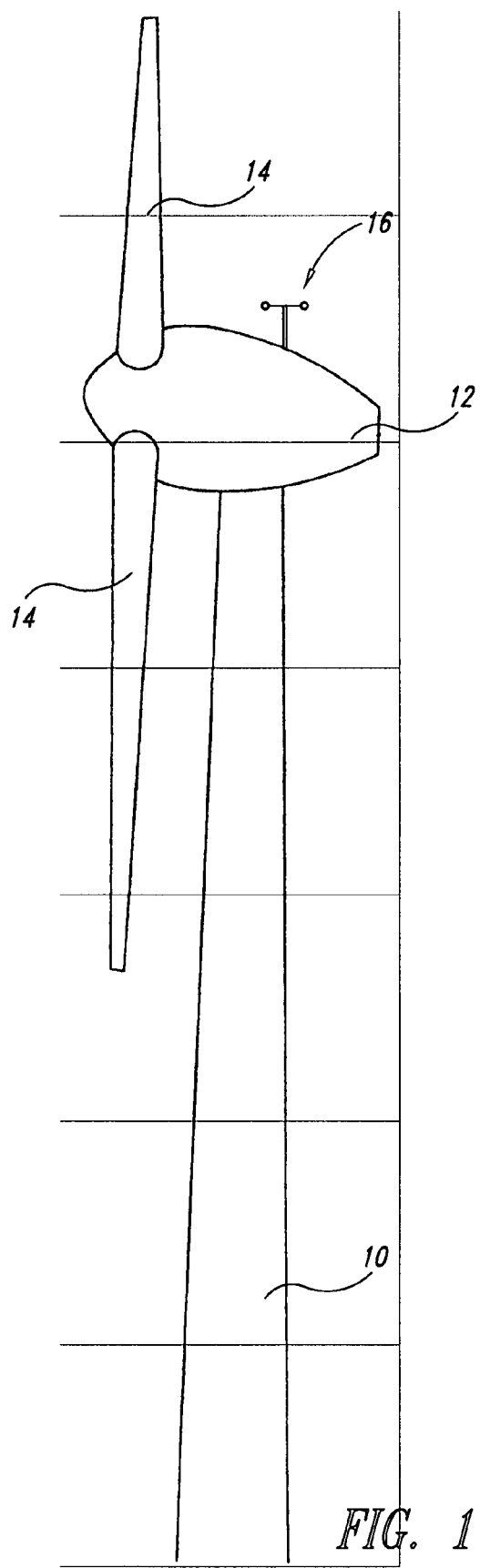
FIG. 1 shows a wind power installation.

FIG. 1 shows a wind power installation comprising a pylon 10, a pod 12 arranged on the pylon 10, with a rotor having rotor blades 14 for driving a generator arranged in the pod, the generator producing electrical power in dependence on the wind speed. Also provided on the pod 12 is an anemometer 16 for detecting the wind speed.

As, in particular in winter, in cold weather conditions, the anemometer 16 can certainly suffer from icing and thus the wind speed can be incorrectly indicated, the anemometer 16 is monitored by the power produced by the wind power installation, which is dependent on the wind speed, being correlated with the reading from the anemometer 16. If the generated power of the wind power installation is higher than would be expected according to the wind speed ascertained by the anemometer 16, it is possible to deduce therefrom that the anemometer is not functioning faultlessly as the generated power could finally not be produced if the wind speed were not sufficient for that to happen.

Figure 2:
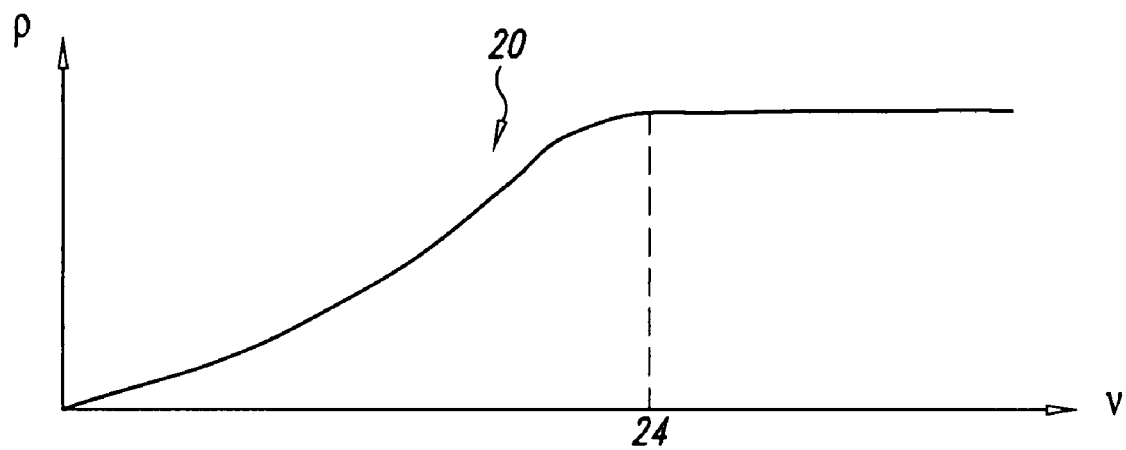
FIG. 2 shows characteristic curves of operating parameters of the wind power installation.
Figure 2:
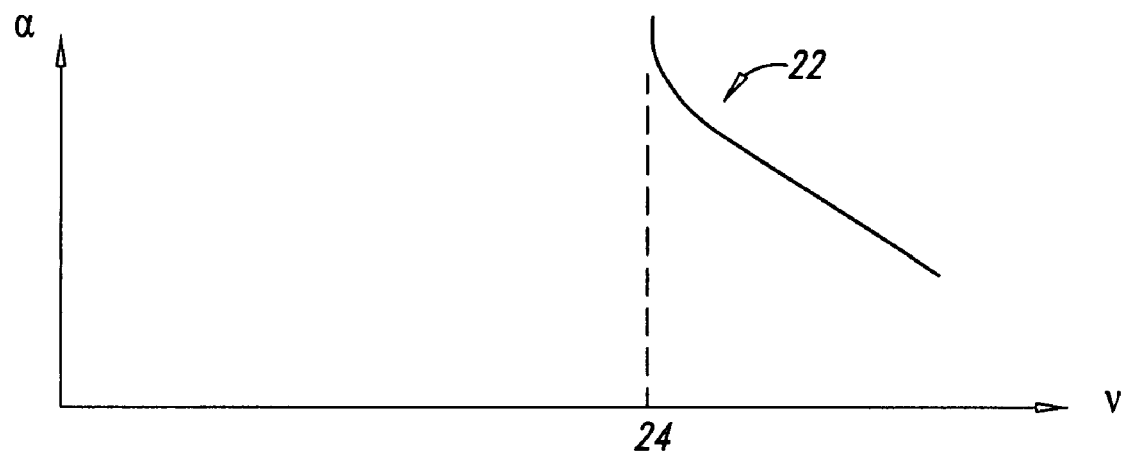

That relationship is shown once again in FIG. 2 by means of characteristic curves. The characteristic curve 20 represents the variation in the power produced by the wind power installation in dependence on the wind speed. The abscissa is therefore identified by 'V' for the wind speed and the ordinate by 'P' for power. As can be seen from the characteristic curve, the power rises with increasing wind speed until the nominal wind speed is reached at a point marked by 24 on the abscissa. From here on the wind power installation produces the nominal power. Thus, at least for the range from the origin of the curve to that switch-over point 24, the wind speed can be correlated with the power produced, in order to deduce from that correlation whether the anemometer 16 is functioning properly.

After the nominal wind speed is reached however the curve 20 no longer provides any usable indication in regard to the correlation with the wind speed specified by the anemometer. Instead of the power characteristic curve however it is now possible to use the blade angle characteristic curve 22. From the moment of reaching the nominal wind speed and with a wind speed which further increases, more specifically the pitch angle of the rotor blades is altered. That is illustrated in the lower characteristic curve: here the abscissa is once again marked by 'V' for the wind speed and the ordinate by 'a' for the pitch angle of the rotor blades. It can be seen from the curve that the pitch angle decreases with increasing wind speed. Thus, after the curve goes beyond the switch-over point 24, it is possible, on the basis of the pitch angle 'a' of the rotor blades, to determine whether the anemometer 16 is still specifying the correct wind speed.

It will be appreciated that, instead of that successive use of a plurality of operating parameters, such use being dependent on the range of operation of the wind power installation, it is also possible for those parameters to be taken into consideration simultaneously. Therefore, as long as the wind speed is below the nominal wind speed, the electric power generated by the installation is used as the operating parameter and at the same time the pitch angle of the rotor blades 14 is investigated. After the curve has gone beyond the switch-over point 24 and thus the nominal wind speed has been exceeded, the pitch angle of the rotor blades 14 is now used and at the same time the power generated by the installation is taken into consideration.

Figure 3:
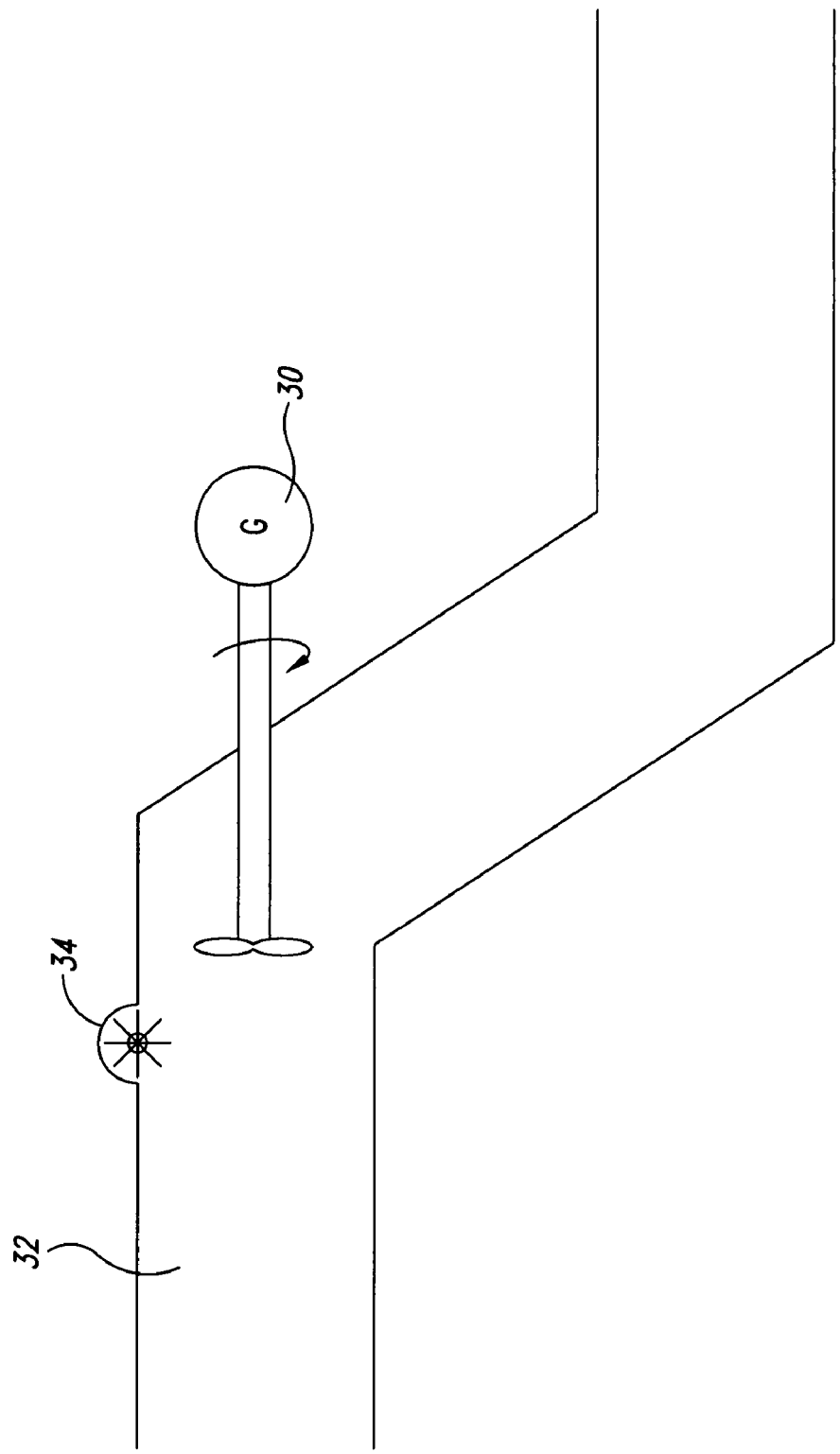
FIG. 3 is a simplified schematic of a hydroelectric plant making use of the invention.

As shown in FIG. 3, it will be appreciated that this method according to the invention and the apparatus can be applied not only in relation to wind power installations. In hydroelectric power stations 30, the amount of water 32 flowing therethrough can be measured by sensor 34 and correlated with the electrical power generated.

Figure 4:
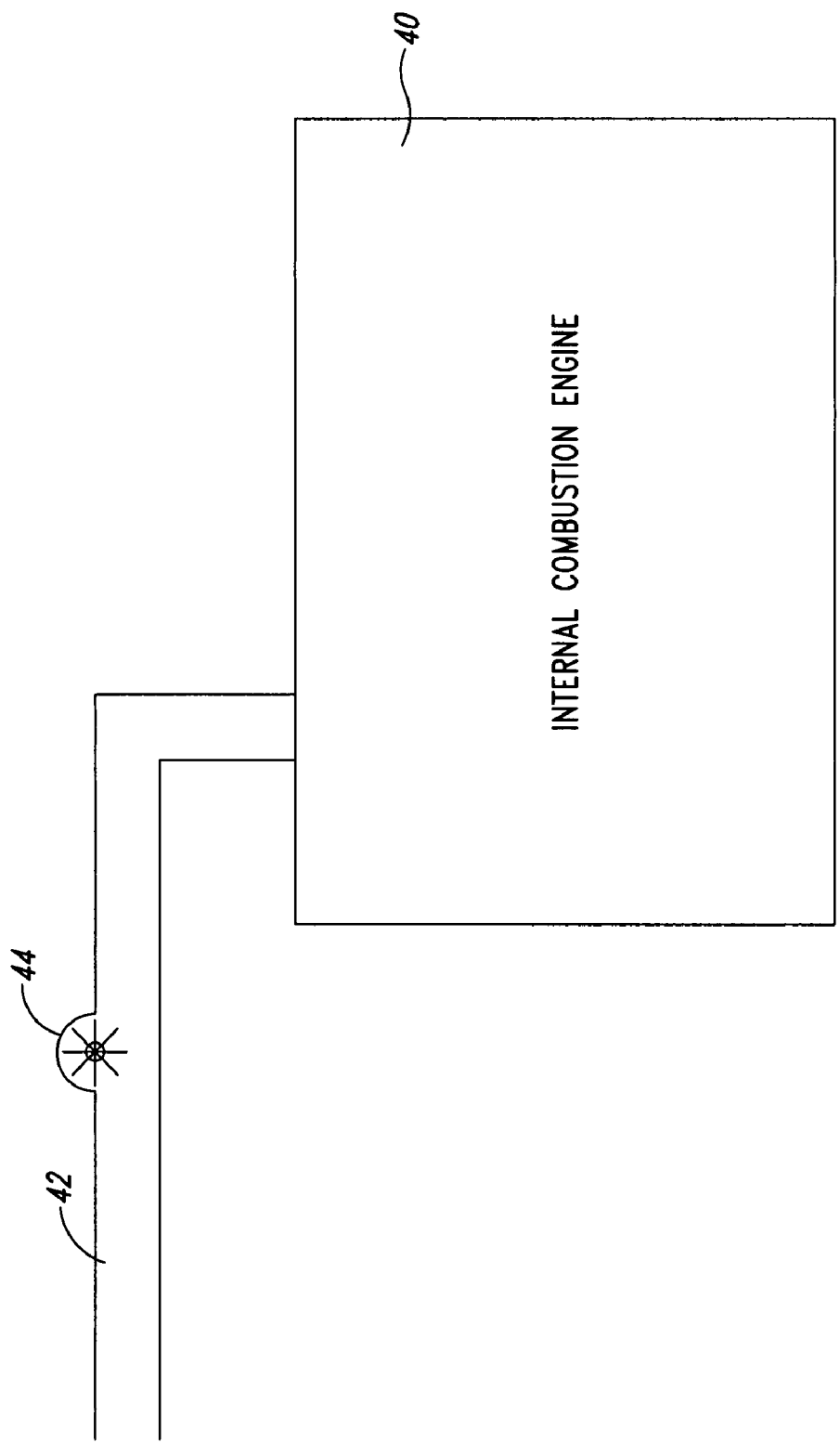
FIG. 4 is a simplified schematic of an internal combustion engine making use of the invention

As shown in FIG. 4, these methods and this apparatus can also be used even in internal combustion engines 40, in order for example to monitor the feed of fuel 42 by senor 44. Here the quantitative through-flow rate of the fuel 42 can be correlated with the mechanical power produced.

The power output of the wind power installation and the pitch angle are combined and used to obtain an estimated wind speed. This estimate is thus obtained from the operating parameter of the wind power installation. These are then correlated or compared to the data collected by the sensor, in one example a wind speed as sensed by the anemometer. The accuracy of the data output by the sensor can therefore be checked. This may permit recalibration of the sensor, fixing the sensor, or in some cases, substituting the data from the wind installation as the valid data in place of the data collected by the sensor.

All of the above U.S. patents, U.S. patent application publications, U.S. patent applications, foreign patents, foreign patent applications and non-patent publications referred to in this specification and/or listed in the Application Data Sheet, including but not limited to copending nonprovisional utility application entitled, "METHOD FOR MONITORING A SENSOR," having Ser. No. 10/496,335, filed Nov. 1, 2004, which is the U.S. National Phase of PCT/EP02/12721 filed Nov. 14, 2002; and German Application No. DE 101 57 759.1 filed Nov. 27, 2001, are incorporated herein by reference, in their entirety.

From the foregoing it will be appreciated that, although specific embodiments have been described herein for purposes of illustration, various modifications may be made without deviating from the spirit and scope of the invention. Accordingly, the embodiments are not limited except as by the appended claims.

The invention claimed is:

1. A system for determining functionality of a sensor of a wind power installation, comprising:
   an anemometer operable to detect wind speed adjacent to the wind power installation; and
   a correlation device operable to calculate a calculated wind speed using data from an operating parameter associated with a power output of the wind power installation when the power output of the wind power installation is less than a nominal power and operable to correlate the detected wind speed with the calculated wind speed to determine the functionality of the anemometer.

2. The system of claim 1, further comprising:
   a rotor blade operable to drive a generator of the wind power installation, wherein the wind speed is calculated from a pitch angle of the rotor blade when the power output of the wind power installation is greater than a nominal power.

3. The system of claim 1 wherein the correlation device is further operable to determine the accuracy of the anemometer.

4. The system of claim 1 wherein the correlation device is integrated into the wind power installation.

5. The system of claim 1 wherein the anemometer is arranged at or in the wind power installation.

6. A system, comprising:
   a wind turbine operable to produce electric power from air flowing over blades of the wind turbine;
   a flow speed sensor operable to detect a flow speed of the air over the blades of the wind turbine; and
   a correlation device operable to calculate a calculated flow speed of the air using data from a power output of a generator of the wind turbine and operable to correlate the detected flow speed with the calculated flow speed to determine the functionality of the flow speed sensor.

7. The system of claim 6 wherein the correlation device is further operable to determine the accuracy of the flow speed sensor.

8. The system of claim 6 wherein the flow speed sensor is an anemometer.

9. The system of claim 6 wherein the flow speed sensor is a quantitative through-flow measuring device operable to measure the flow speed of the air.

10. A method for determining functionality of a sensor of a wind power installation, comprising:
    detecting wind speed adjacent to the wind power installation with an anemometer;
    determining the wind speed based upon data from the anemometer;
    calculating a calculated wind speed from an operating parameter of the wind power installation; and
    correlating the determined wind speed detected by the anemometer with the calculated wind speed to determine the functionality of the anemometer.

11. The method of claim 10 wherein calculating the calculated wind speed from the operating parameter comprises:

calculating the calculated wind speed from the power output of the wind power installation in response to the power output of the wind power installation being less than a nominal power.

12. The method of claim 10 wherein calculating the calculated wind speed from the operating parameter comprises:
calculating the calculated wind speed from a pitch angle of a rotor blade of the wind power installation in response to the power output of the wind power installation being greater than a nominal power.

13. The method of claim 10, further comprising:
determining the accuracy of the anemometer based upon the correlation.

14. A method for determining functionality of a sensor of a power installation, comprising:
detecting speed of a flow of a medium based upon the sensor;
determining the flow speed of the medium using data from the sensor;
outputting power from the power installation;
calculating a calculated flow speed of the medium from an operating parameter of the power installation; and
correlating the determined flow speed of the medium detected by the sensor with the calculated flow speed of the medium.

15. The method of claim 14, further comprising:
determining the functionality of the sensor based upon the correlation.

16. The method of claim 14, further comprising:
determining the accuracy of the sensor based upon the correlation.

17. The method of claim 14, further comprising determining the accuracy of the sensor based upon the correlation, and wherein detecting speed of a flow of a medium comprises detecting wind speed adjacent to a wind power installation with an anemometer.

18. The method of claim 14 wherein detecting speed of a flow of a medium comprises:
detecting water speed through a hydroelectric installation with a water speed sensor.

19. The method of claim 14 wherein detecting speed of a flow of a medium comprises:
detecting a fuel flow speed to an internal combustion engine with a fuel sensor.

20. The method of claim 19 wherein the operating parameter is a power output of a generator of the internal combustion engine.

21. The method of claim 19 wherein the operating parameter is a mechanical power output of the internal combustion engine.

22. A system for determining functionality of a sensor of a wind power installation, comprising:
an anemometer operable to detect wind speed adjacent to the wind power installation;
a rotor blade operable to drive a generator of the wind power installation; and
a correlation device operable to calculate a calculated wind speed using a pitch angle of the rotor blade when the power output of the wind power installation is greater than a nominal power and operable to correlate the detected wind speed with the calculated wind speed to determine the functionality of the anemometer.

23. The system of claim 22 wherein the correlation device is further operable to determine the accuracy of the anemometer.

24. The system of claim 22 wherein the correlation device is integrated into the wind power installation.

25. The system of claim 22 wherein the anemometer is arranged at or in the wind power installation.

* * * * *